(12) United States Patent
Kajikiya et al.

(10) Patent No.: US 12,394,903 B2
(45) Date of Patent: Aug. 19, 2025

(54) ANTENNA MODULE

(71) Applicant: TDK Corporation, Tokyo (JP)

(72) Inventors: Shoma Kajikiya, Tokyo (JP); Yoshitomo Sato, Tokyo (JP)

(73) Assignee: TDK CORPORATION, Tokyo (JP)

( * ) Notice: Subject to any disclaimer, the term of this patent is extended or adjusted under 35 U.S.C. 154(b) by 296 days.

(21) Appl. No.: 18/172,642

(22) Filed: Feb. 22, 2023

(65) Prior Publication Data

US 2023/0275350 A1 Aug. 31, 2023

(30) Foreign Application Priority Data

Feb. 28, 2022 (JP) .................... 2022-028874

(51) Int. Cl.
*H01Q 7/00* (2006.01)
*G06K 19/07* (2006.01)
*G06K 19/077* (2006.01)

(52) U.S. Cl.
CPC ........... *H01Q 7/00* (2013.01); *G06K 19/0723* (2013.01); *G06K 19/07749* (2013.01)

(58) Field of Classification Search
CPC ........ H01Q 1/283; H01Q 7/00; H01Q 1/2283; H01Q 1/2225; H01Q 7/0012; H01Q 7/0054; G06K 19/0723; G06K 19/07749
See application file for complete search history.

(56) References Cited

U.S. PATENT DOCUMENTS

| | | | | |
|---|---|---|---|---|
| 10,063,100 B2 * | 8/2018 | Singh | ................... | H01F 27/38 |
| 10,658,740 B2 * | 5/2020 | Noh | ................... | H01F 27/2871 |
| 2009/0108974 A1 * | 4/2009 | Raggam | ........... | G06K 19/07749 336/105 |
| 2013/0038503 A1 * | 2/2013 | Saitoh | ................... | H01Q 21/28 343/867 |
| 2014/0062827 A1 | 3/2014 | Kato | | |
| 2015/0021402 A1 * | 1/2015 | Finn | ................... | H01Q 1/2225 235/492 |
| 2016/0261026 A1 * | 9/2016 | Han | ................... | H04B 5/263 |
| 2017/0040107 A1 * | 2/2017 | Peralta | ................... | H02J 5/00 |
| 2019/0102663 A1 * | 4/2019 | Danler-Baumgartner | ................... | G06K 19/07794 |

(Continued)

FOREIGN PATENT DOCUMENTS

| | | |
|---|---|---|
| JP | 2003-332820 A | 11/2003 |
| JP | 2008-067057 A | 3/2008 |
| JP | 2008-236416 A | 10/2008 |

(Continued)

*Primary Examiner* — Hasan Islam

(74) *Attorney, Agent, or Firm* — XSENSUS LLP

(57) ABSTRACT

Disclosed herein is an antenna module that includes a substrate, a coil pattern formed on the first surface of the substrate, and a magnetic member covering the second surface of the substrate and having a through hole formed therein. The coil pattern has first and second coil sections. The second coil section is disposed in the opening of the first coil section. The inner peripheral end of the first coil section is connected to the outer peripheral end of the second coil section. The second coil section has a first extending section extending along the first coil section and a second extending section protruding from the first extending section toward the through hole in a plan view and wound in an opposite direction to a winding direction of the first extending section in a state overlapping the through hole.

10 Claims, 6 Drawing Sheets

(56) References Cited

U.S. PATENT DOCUMENTS

2020/0028263 A1* 1/2020 Pueschner ............ H01Q 1/2225
2020/0380332 A1* 12/2020 Matsushima ............ H01Q 7/00

FOREIGN PATENT DOCUMENTS

| JP | 2020-195050 A | 12/2020 |
| WO | 2013/035821 A1 | 3/2013 |

* cited by examiner

ANTENNA MODULE

CROSS-REFERENCE TO RELATED APPLICATION

This application claims the benefit of Japanese Patent Application No. 2022-028874, filed on Feb. 28, 2022, the entire disclosure of which is incorporated by reference herein.

BACKGROUND

The present disclosure relates to an antenna module.

JP 2020-195050A discloses an IC card having a wireless communication function. The IC card described in JP 2020-195050A incorporates therein: a magnetic member; an antenna module having an antenna coil overlapping the magnetic member and a coupling coil overlapping a through hole formed in the magnetic member; and an IC module electromagnetic-field coupled with the coupling coil.

In the antenna module described in JP 2020-195050A, the antenna coil is formed on one surface of a substrate, and a coupling coil is formed on the other surface of the substrate. That is, it is necessary to form a conductor pattern on both surfaces of the substrate and thus necessary to provide a via conductor for connecting the conductor patterns on both surfaces of the substrate, requiring improvement in terms of a manufacturing process.

SUMMARY

An antenna module according to the present disclosure includes: a substrate; a coil pattern formed on one surface of the substrate; and a magnetic member covering the other surface of the substrate and having a through hole formed therein. The coil pattern has first and second coil sections. The second coil section is disposed in the opening of the first coil section. The inner peripheral end of the first coil section is connected to the outer peripheral end of the second coil section. The second coil section has a first extending section extending along the first coil section and a second extending section protruding from the first extending section toward the through hole in a plan view and wound in the opposite direction to the winding direction of the first extending section in a state overlapping the through hole.

BRIEF DESCRIPTION OF THE DRAWINGS

The above features and advantages of the present disclosure will be more apparent from the following description of certain preferred embodiments taken in conjunction with the accompanying drawings, in which.

DETAILED DESCRIPTION OF THE EMBODIMENTS

An object of the present disclosure to provide an antenna module capable of being manufactured with a simpler process.

Preferred embodiments of the present disclosure will be explained below in detail with reference to the accompanying drawings.

Figure 1:
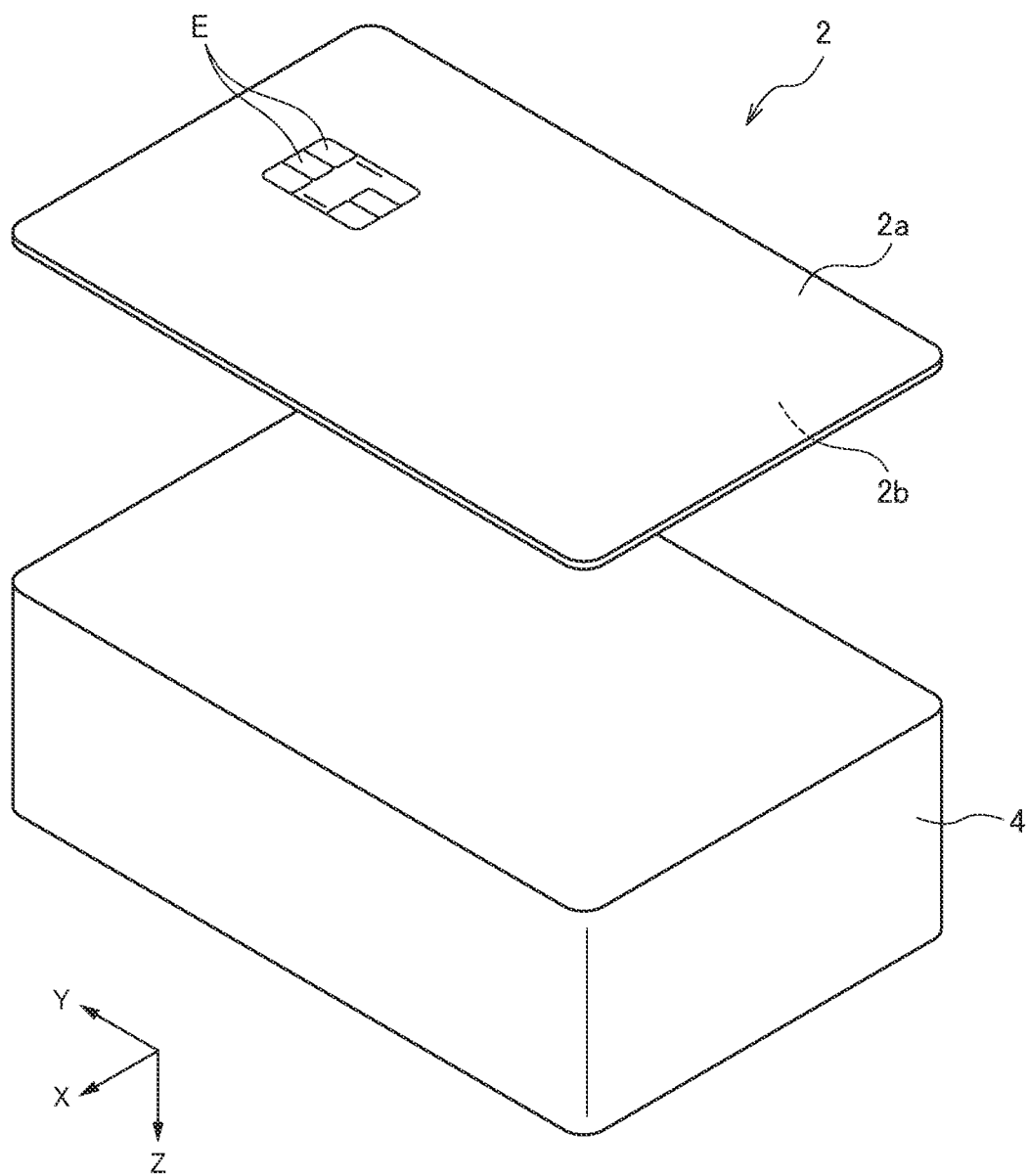
FIG. 1 is a schematic perspective view illustrating the outer appearance of an IC card 2 having an antenna module according to one embodiment of the present disclosure.

FIG. 1 is a schematic perspective view illustrating the outer appearance of an IC card 2 having an antenna module according to one embodiment of the present disclosure.

As illustrated in FIG. 1, the IC card 2 according to the present embodiment is a plate-like body in which the Y-direction is a long side direction, the X-direction is a short side direction, and the Z-direction is the thickness direction and has a top surface 2a and a back surface 2b which constitute the YX plane. The IC card 2 incorporates therein an IC module to be described later, and a terminal electrode E of the IC module is exposed to the top surface 2a of the IC card 2. The IC card 2 can perform communication in a state where the back surface 2b faces a card reader 4.

Figure 2:
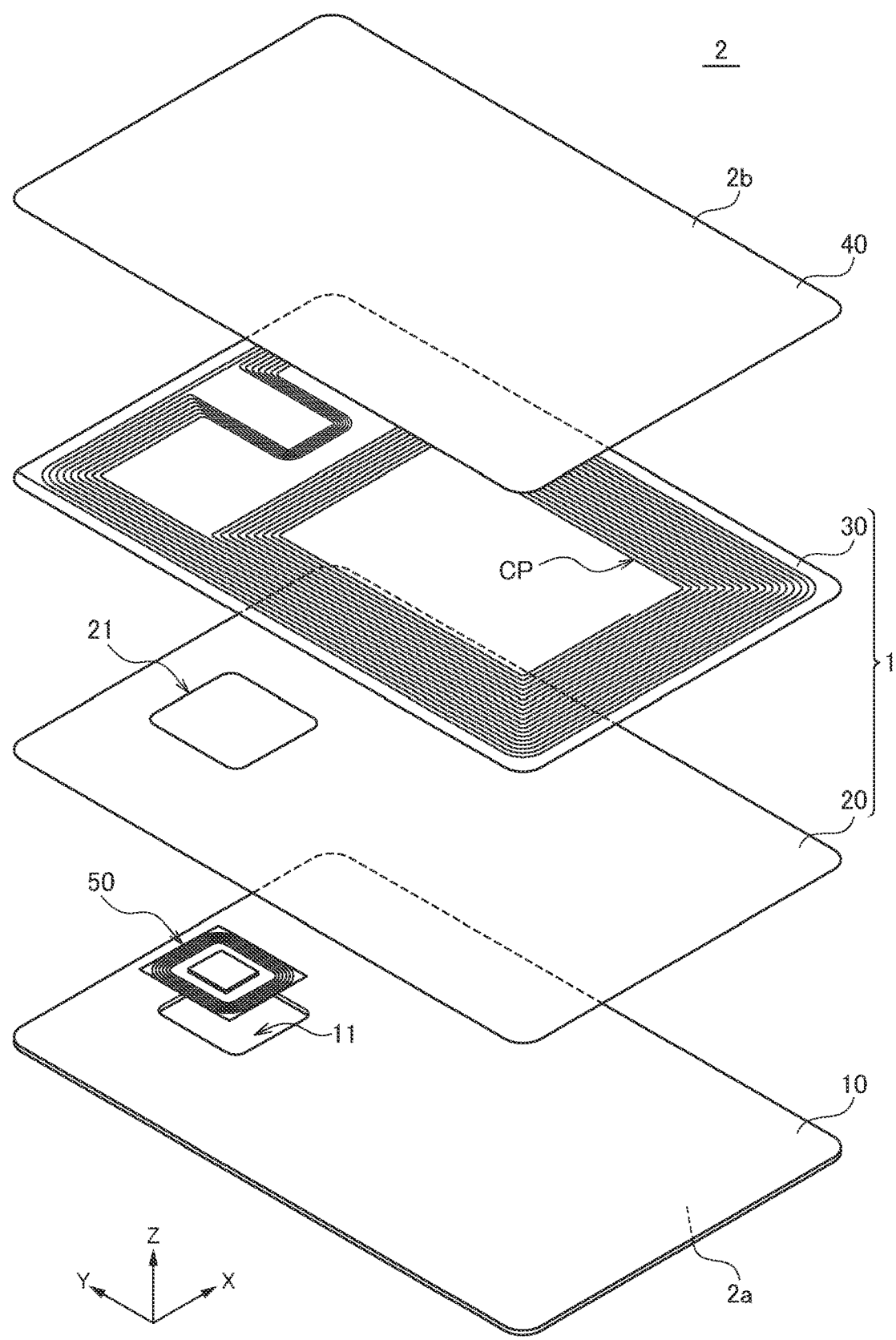
FIG. 2 is a schematic exploded perspective view for explaining the structure of the IC card 2 having an antenna module 1 according to the one embodiment of the present disclosure.

FIG. 2 is a schematic exploded perspective view for explaining the structure of the IC card 2 having an antenna module 1 according to the one embodiment of the present disclosure.

The IC card 2 illustrated in FIG. 2 has a structure in which a metal plate 10, a magnetic member 20, a substrate 30, and a cover layer 40 are stacked in this order from the one surface (top surface) 2a side toward the other surface 2b (back surface 2b) side. The metal plate 10 is made of a metal material such as stainless steel or titanium, and the surface thereof constitutes the one surface 2a of the IC card 2. The metal plate 10 has an opening 11, and an IC module 50 is disposed inside the opening 11.

The substrate 30 is a film made of an insulating resin material such as PET (Poly Ethylene Terephthalate), and a coil pattern CP which is a conductor pattern made of a good conductor such as copper is formed on one surface of the substrate 30. No conductor pattern is formed on the other surface of the substrate 30, and thus there is no via conductor penetrating the substrate 30. The other surface of the substrate 30 is covered with the magnetic member 20. The magnetic member 20 has a through hole 21. The magnetic member 20 may be a cured paste member which is a mixture of magnetic particles and resin or may be a sheet-like member. The antenna module 1 according to the present embodiment is constituted by the substrate 30, the conductor pattern formed on the substrate 30, and the magnetic member 20.

Figure 3:
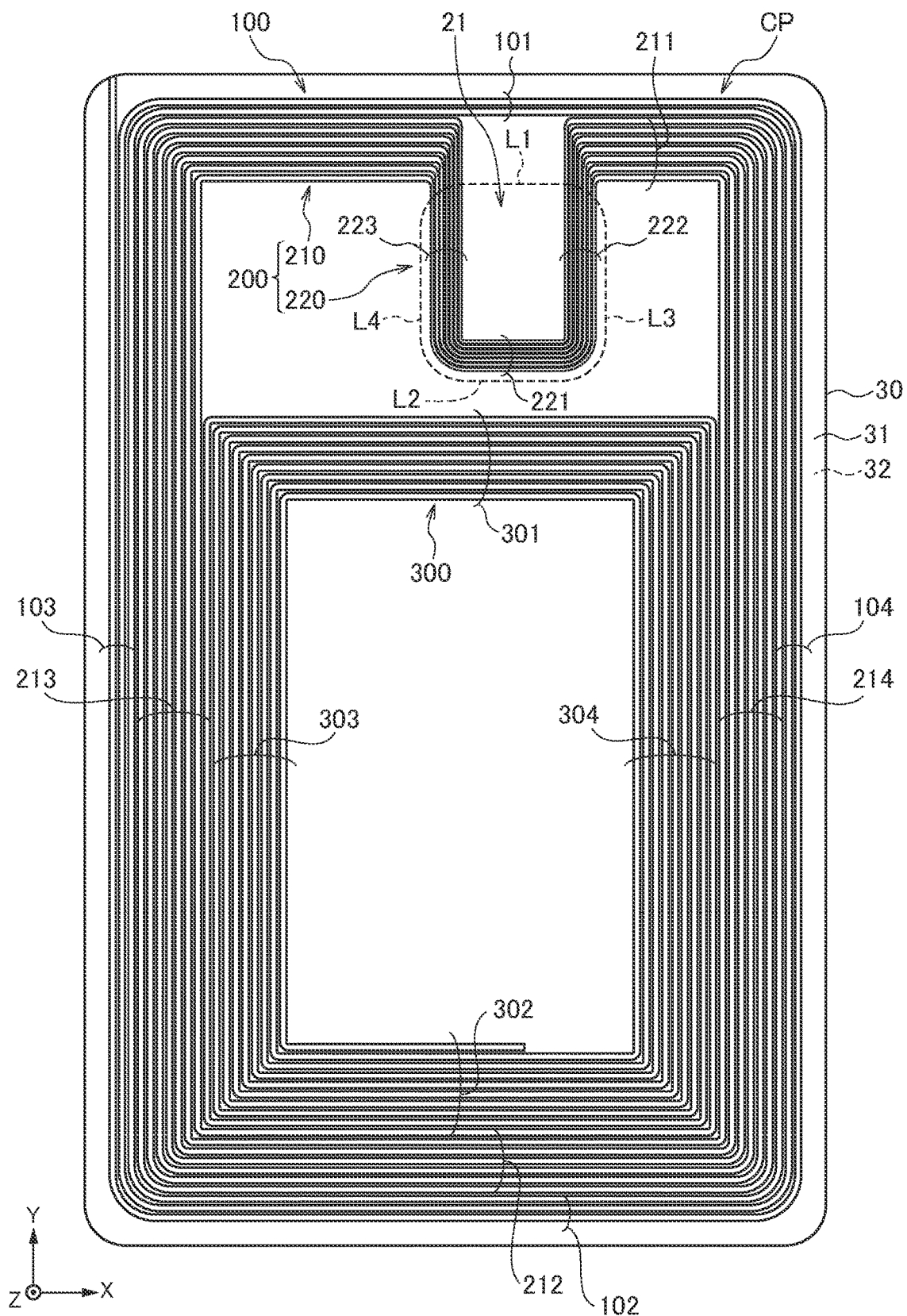
FIG. 3 is a schematic plan view illustrating the pattern shape of the coil pattern CP formed on one surface of the substrate 30.

FIG. 3 is a schematic plan view illustrating the pattern shape of the coil pattern CP formed on one surface 31 of the substrate 30. In FIG. 3, the through hole 21 of the magnetic member 20 positioned on the other surface 32 side of the substrate 30 is denoted by the dashed line.

As illustrated in FIG. 3, the coil pattern CP formed on the surface 31 of the substrate 30 includes first and third coil sections 100 and 300 functioning as an antenna coil and a second coil section 200 functioning as an antenna coil and a coupling coil. The first, second, and third coil sections 100, 200, and 300 are connected in series in this order from the outer peripheral end toward the inner peripheral end of the coil pattern CP. Specifically, the inner peripheral end of the first coil section 100 is connected to the outer peripheral end of the second coil section 200, and the inner peripheral end of the second coil section 200 is connected to the outer peripheral end of the third coil section 300. Accordingly, the second coil section 200 is disposed in the opening of the first coil section 100, and the third coil section 300 is disposed in the opening of the second coil section 200.

Both ends of the coil pattern CP, i.e., the outer peripheral end of the first coil section 100 and the inner peripheral end of the third coil section 300 are opened. That is, the outer peripheral end of the first coil section 100 and the inner peripheral end of the third coil section 300 each terminate without being connected to another conductor pattern or a circuit element. Thus, although a DC current does not flow in the coil pattern CP, an LC circuit is formed by a parasitic capacitance generated between adjacent conductor patterns, so that resonance occurs at a predetermined frequency band. By making the predetermined frequency band in which the resonance occurs coincide with the frequency band (e.g., 13.56 MHz band) of near field wireless communication, the antenna module 1 can perform near field wireless communication.

The first coil section 100 has sections 101 and 102 extending in the X-direction (short side direction) and sections 103 and 104 extending in the Y-direction (long side direction). Each of the sections 101 to 104 constituting the first coil section 100 completely overlap the magnetic member 20 without overlapping the through hole 21. In the example illustrated in FIG. 3, the first coil section 100 has about three turns.

The first coil section 100 is a conductor pattern wound in a rectangular shape corresponding to the outer shape of the IC card 2 in a plan view (as viewed in the Z-direction). However, the first coil section 100 need not necessarily be strictly rectangular but may be approximately rectangular. For example, as illustrated in FIG. 3, four corners of the first coil section 100 may be rounded. In this case, the short side of the first coil section 100 may be defined as a straight line section extending in the X-direction, and the long side of the first coil section 100 may be defined as a straight line section extending in the Y-direction.

The second coil section 200 has a first extending section 210 extending along the first coil section 100 and a second extending section 220 protruding toward the through hole 21 of the magnetic member 20 from the first extending section 210 in a plan view (as viewed in the Z-direction) and overlapping the through hole 21 in a plan view. The second extending section 220 is smaller in pattern width than the first extending section 210. That is, lines constituting the conductor pattern of the second extending section 220 are wound with higher density than those of the first extending section 210. This makes it possible to sufficiently ensure the number of lines in the second extending section 220 wound in a narrow area while reducing a resistance value of the first extending section 210. In the example illustrated in FIG. 3, the second coil section 200 has about seven turns.

The first extending section 210 of the second coil section 200 has sections 211, 212, 213, and 214 wound respectively along the sections 101, 102, 103, and 104 of the first coil section 100. Each of the sections 211 to 214 constituting the first extending section 210 completely overlap the magnetic member 20 without overlapping the through hole 21. The through hole 21 is formed in the vicinity of the section 211, and the second coil section 200 transits from the first extending section 210 to the second extending section 220 at a position overlapping the through hole 21 in the Y-direction. The second extending section 220 of the second coil section 200 has first, second, and third sections 221, 222, and 223 extending respectively along second, third, and fourth sides L2, L3, and L4 of the through hole 21. Thus, a large part of the second extending section 220 constituted by the first to third sections 221 to 223 does not overlap the magnetic member 20. The first and second sides L1 and L2 of the through hole 21 extend in the X-direction along the short side of the first coil section 100 and positioned on mutually opposite sides. The third and fourth sides L3 and L4 of the through hole 21 extend in the Y-direction along the long side of the first coil section 100 and positioned on mutually opposite sides. The first side L1 of the through hole 21 is positioned closer to the first coil section 100 than the second side L2. The second extending section 220 thus has the first section 221 extending in the X-direction and second and third sections 222 and 223 extending in the Y-direction, so that it does not completely make one round at a portion overlapping the through hole 21 but turned by 270°, thus allowing the second coil section 200 to function as an antenna coil which is electromagnetic-field coupled with the IC module 50. The second and third sections 222 and 223 each mostly overlap the through hole 21 but each do not overlap the through hole 21 in the vicinity of the portion connecting with the first extending section 210.

Thus, when a current is made to flow in the coil pattern CP from its outer peripheral end to inner peripheral end, the current flows counterclockwise in the first extending section 210 of the second coil section 200, while the current flows clockwise in the second extending section 220 of the second coil section 200. That is, the winding direction of the first extending section 210 overlapping the magnetic member 20 and the winding direction of the second extending section 220 not overlapping the magnetic member 20 are opposite to each other. The second extending section 220 of the second coil section 200 does not have a section extending along the first side L1 of the through hole 21, so that the second section 222 extending in the Y-direction is directly connected to the section 211 extending in the X-direction not through the section extending along the first side L1. Similarly, the third section 223 extending in the Y-direction is directly connected to the section 211 extending in the X-direction not through the section extending along the first side L1.

The third coil section 300 has sections 301 and 302 extending in the X-direction (short side direction) and sections 303 and 304 extending in the Y-direction (long side direction). Each of the sections 301 to 304 constituting the third coil section 300 completely overlaps the magnetic member 20 without overlapping the through hole 21. In the example illustrated in FIG. 3, the number of turns of the third coil section 300 is larger than that of the first coil section 100 and is about nine.

With such a configuration as described above, the first coil section 100, the first extending section 210 of the second coil section 200, and third coil section 300, all of which overlap the magnetic member 20, function as an antenna coil, thus allowing communication to be performed at the surface 2b side of the IC card 2. On the other hand, the second extending section 220 of the second coil section 200 does not overlap the magnetic member 20 and faces the IC module 50 through the through hole 21 formed in the magnetic member 20 to be electromagnetic-field coupled with the IC module 50. As a result, the first coil section 100, the first extending section 210 of the second coil section 200, and the third coil section 300 functioning as an antenna coil are connected to the IC module 50 through the second extending section 220 functioning as a coupling coil.

Further, in the antenna module 1 according to the present embodiment, the coil pattern CP is provided only on the surface 31 of the substrate 30, and no conductor pattern is provided on the surface 32 of the substrate 30. This allows the antenna module 1 to be manufactured in a very simple process. In addition, in the present embodiment, the third coil section 300 which is positioned at the inner peripheral side and in which the line length per turn is shorter is larger in the number of turns than the first coil section 100 which is positioned at the outer peripheral side and in which the line length per turn is longer. Accordingly, the second extending section 220 of the second coil section 200 functioning as a coupling coil is positioned closer to the center of the line length, thereby making it possible to increase an output by electromagnetic field coupling through the second extending section 220.

Figure 4:
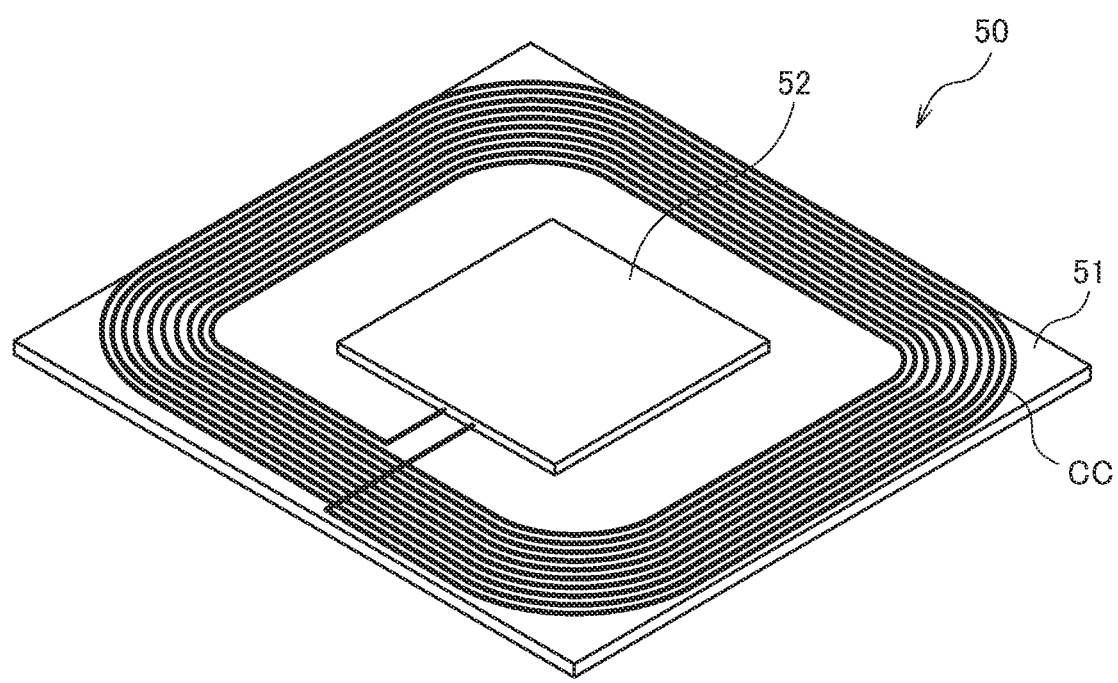
FIG. 4 is a schematic perspective view of the IC module as viewed from the back surface side thereof.

FIG. 4 is a schematic perspective view of the IC module as viewed from the back surface side thereof.

As illustrated in FIG. 4, the IC module 50 has a module board 51 and an IC chip 52 mounted on or incorporated in the module board 51, and a coupling coil CC is formed on the back surface of the module board 51. On the front surface side of the module board 51, the terminal electrode E illustrated in FIG. 1 is provided. When the coupling coil CC and the second extending section 220 of the second coil section 200 of the coil pattern CP formed on the substrate 30 overlap each other, electromagnetic field coupling occurs. This makes it possible to AC-connect the first coil section 100, first extending section 210 of the second coil section 200, and third coil section 300 of the coil pattern CP functioning as an antenna coil to the IC module 50 through the coupling coil CC without directly connecting them using a terminal electrode or the like.

Figure 5:
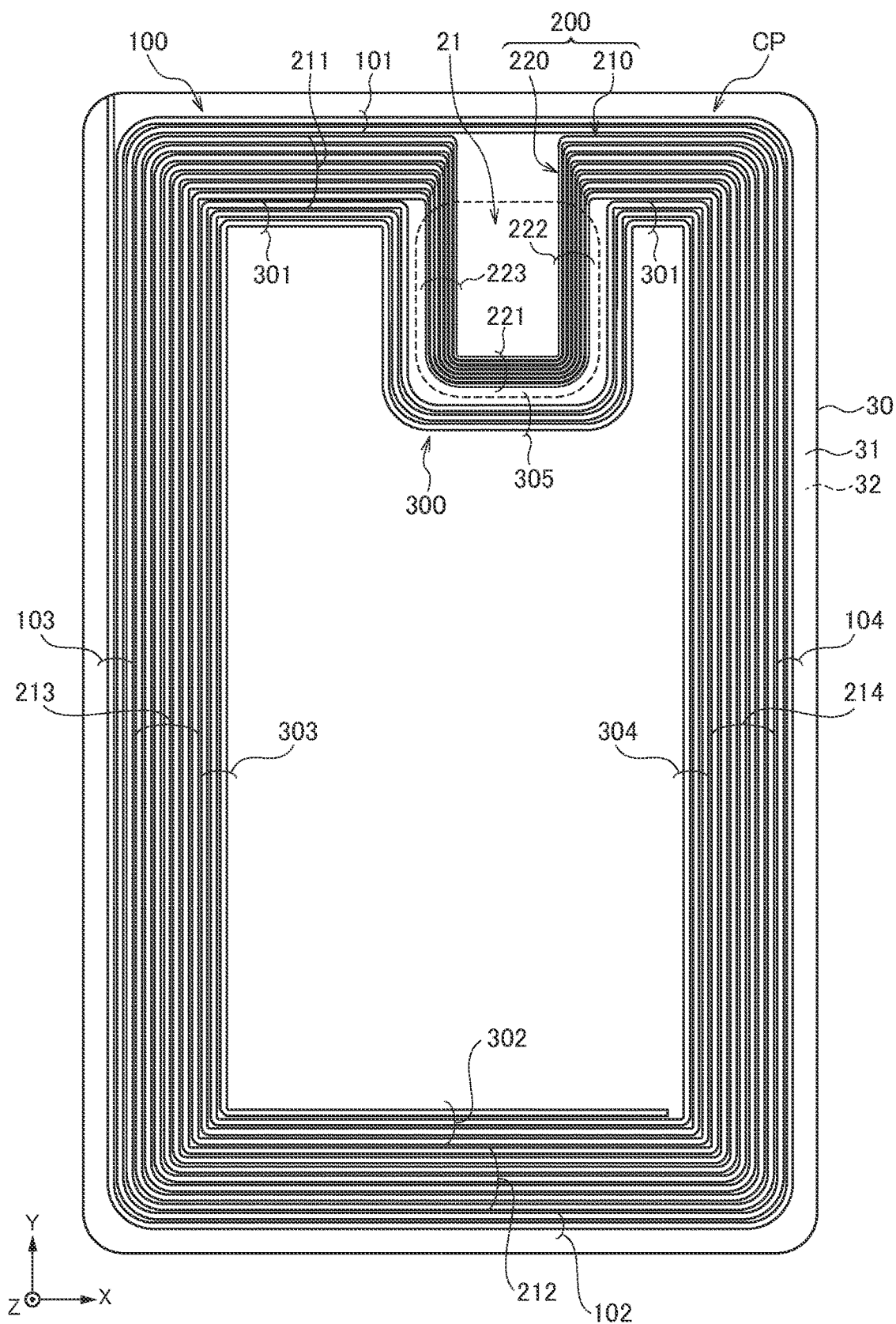
FIG. 5 is a schematic plan view illustrating the pattern shape of the coil pattern CP according to a first modification.

FIG. 5 is a schematic plan view illustrating the pattern shape of the coil pattern CP according to a first modification.

The coil pattern CP according to the first modification illustrated in FIG. 5 differs from the coil pattern CP illustrated in FIG. 3 in that the third coil section 300 is wound along the first and second extending sections 210 and 220 of the second coil section 200. Other basic configurations are the same as those of the coil pattern CP illustrated in FIG. 3, so the same reference numerals are given to the same elements, and overlapping description will be omitted.

In the coil pattern CP according to the first modification, the third coil section 300 includes sections 301 to 305, of which the sections 301, 302, 303, and 304 are wound respectively along the sections 211, 212, 213, 214 of the first extending section 210, and the section 305 is wound along the second extending section 220. Thus, when a current is made to flow in the coil pattern CP from its outer peripheral end to inner peripheral end, the current flows counterclockwise in the sections 301 to 304 of the third coil section 300, while the current flows clockwise in the section 305 of the third coil section 300. By thus winding the third coil section 300 along the first and second extending sections 210 and 220 of the second coil section 200, a parasitic capacitance increases, allowing a reduction in self-resonance frequency.

Figure 6:
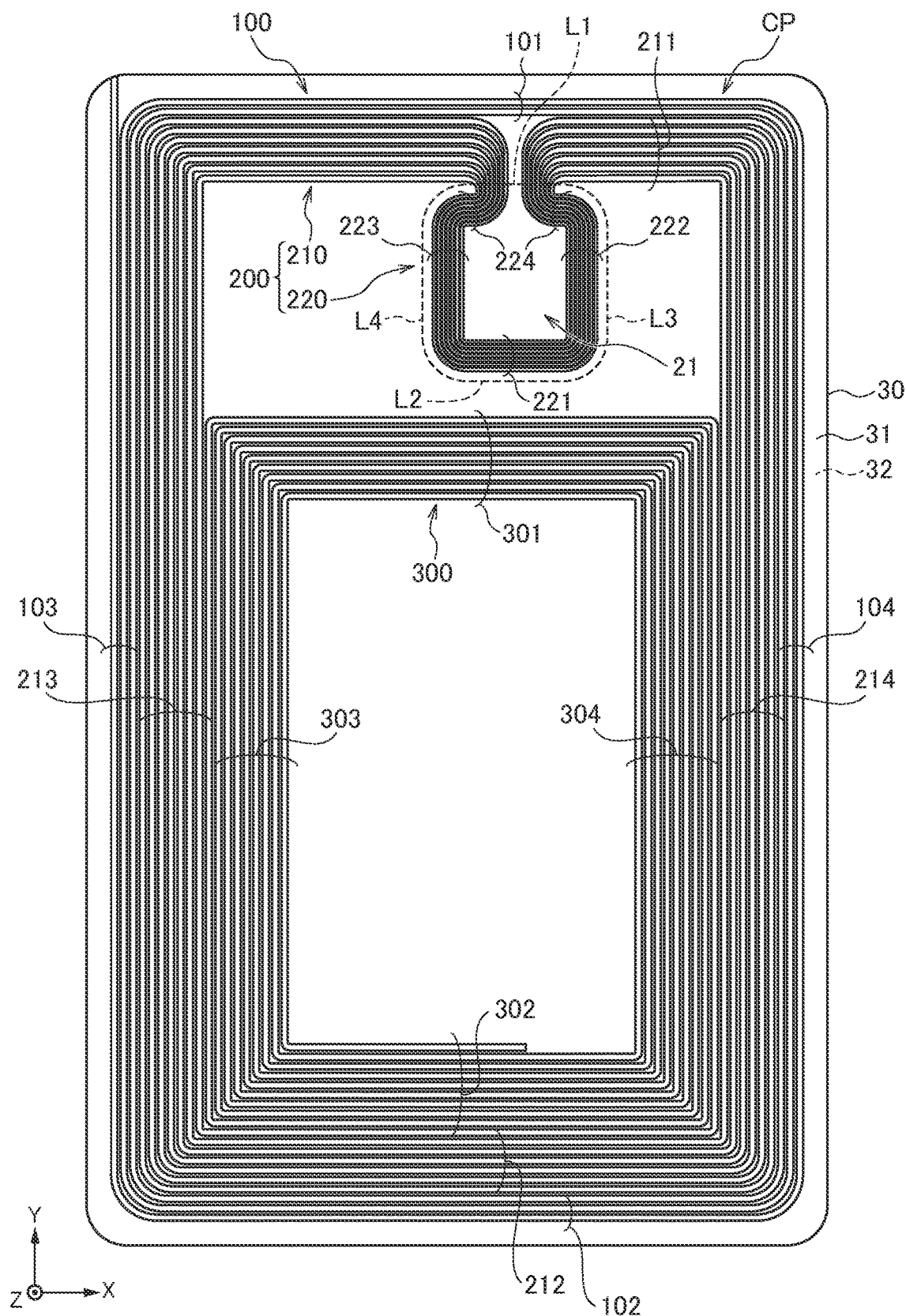
FIG. 6 is a schematic plan view illustrating the pattern shape of the coil pattern CP according to a second modification.

FIG. 6 is a schematic plan view illustrating the pattern shape of the coil pattern CP according to a second modification.

The coil pattern CP according to the second modification illustrated in FIG. 6 differs from the coil pattern CP illustrated in FIG. 3 in that the second extending section 220 of the second coil section 200 further includes a fourth section 224 extending along the first side L1 of the through hole 21. Other configurations are the same as those of the coil pattern CP illustrated in FIG. 3, so the same reference numerals are given to the same elements, and overlapping description will be omitted.

In the coil pattern CP according to the second modification, the total area of the second extending section 220 that overlaps the through hole 21 increases. As exemplified by the second modification, the second and third sections 222 and 223 extending in the Y-direction may be connected to the section 211 extending in the X-direction through the fourth section 224 extending along the first side L1.

While the preferred embodiment of the present disclosure has been described, the present disclosure is not limited to the above embodiment, and various modifications may be made within the scope of the present disclosure, and all such modifications are included in the present disclosure.

For example, although the coil pattern CP is constituted by the first, second, and third coil sections 100, 200, and 300 in the above embodiment, the third coil section 300 may be omitted. Further, the number of the second extending sections 220 included in the second coil section 200 is not limited to one, and when a plurality of IC modules 50 exist, a plurality of second extending sections 220 may be provided so as to overlap the plurality of the respective IC modules 50 each through the through hole 21.

The technology according to the present disclosure includes the following configuration examples but not limited thereto.

An antenna module according to the present disclosure includes: a substrate; a coil pattern formed on one surface of the substrate; and a magnetic member covering the other surface of the substrate and having a through hole formed therein. The coil pattern has first and second coil sections. The second coil section is disposed in the opening of the first coil section. The inner peripheral end of the first coil section is connected to the outer peripheral end of the second coil section. The second coil section has a first extending section extending along the first coil section and a second extending section protruding from the first extending section toward the through hole in a plan view and wound in the opposite direction to the winding direction of the first extending section in a state overlapping the through hole. This eliminates the need to form a conductor pattern on the other surface of the substrate, making it possible to simplify a manufacturing process.

Both ends of the coil pattern may be opened. This eliminates the need to connect the coil pattern to another circuit element, making it possible to further simplify a manufacturing process.

The through hole may have first and second sides extending in the short side direction of the first coil section and positioned on mutually opposite sides and third and fourth sides extending in the long side direction of the first coil section and positioned on mutually opposite sides, and the second extending section may have first, second, and third sections extending respectively along the second, third, and fourth sides. This makes it possible to achieve sufficient electromagnetic field coupling with an IC module. In this case, the second and third sections may be connected to the first extending section not through a section extending along the first side. This prevents canceling between magnetic fields generated by the turning of the conductor pattern from occurring, thereby making it possible to improve communication characteristics.

The pattern width of the second extending section may be smaller than the pattern width of the first extending section. This makes it possible to sufficiently ensure the number of lines in the second extending section wound in a narrow area while reducing a resistance value of the first extending section.

The coil pattern may further have a third coil section disposed in the opening of the second coil section and not overlapping the through hole, and the inner peripheral end of the second coil section may be connected to the outer peripheral end of the third coil section. This makes it possible to further improve communication characteristics and to reduce self-resonance frequency. In this case, the third coil section may be wound along the first and second extending sections of the second coil section. This allows a further reduction in self-resonance frequency. Further, the number of turns of the third coil section may be larger than the number of turns of the first coil section. This allows the second coil section to be positioned closer to the center of the line length.

What is claimed is:

1. An antenna module comprising:
   a substrate having first and second surfaces opposite to each other;
   a coil pattern formed on the first surface of the substrate; and
   a magnetic member covering the second surface of the substrate and having a through hole formed therein,
   wherein the coil pattern has first and second coil sections,
   wherein the second coil section is disposed in an opening of the first coil section,
   wherein an inner peripheral end of the first coil section is connected to an outer peripheral end of the second coil section,
   wherein the second coil section has a first extending section extending along the first coil section and a second extending section protruding from the first extending section toward the through hole in a plan view and wound in an opposite direction to a winding direction of the first extending section in a state overlapping the through hole, and
   wherein there is no coil pattern on the second surface of the substrate.

2. The antenna module as claimed in claim 1, wherein both ends of the coil pattern are opened.

3. The antenna module as claimed in claim 1,
   wherein the through hole has first and second sides extending in a short side direction of the first coil section and positioned on mutually opposite sides and third and fourth sides extending in a long side direction of the first coil section and positioned on mutually opposite sides, and
   wherein the second extending section has first, second, and third sections extending respectively along the second, third, and fourth sides.

4. The antenna module as claimed in claim 3, wherein the second and third sections are connected to the first extending section not through a section extending along the first side.

5. The antenna module as claimed in claim 3, wherein:
   the substrate has opposing short sides and opposing long sides,
   the first side of the through hole is parallel with and proximate to one short side and the second side of the through hole is parallel with and distal to the one short side, and
   the second extending section does not extend parallel and adjacent to the first side of the through hole.

6. The antenna module as claimed in claim 1, wherein a pattern width of the second extending section is smaller than a pattern width of the first extending section.

7. The antenna module as claimed in claim 1,
   wherein the coil pattern further has a third coil section disposed in an opening of the second coil section and not overlapping the through hole, and
   wherein an inner peripheral end of the second coil section is connected to an outer peripheral end of the third coil section.

8. The antenna module as claimed in claim 7, wherein the third coil section is wound along the first and second extending sections of the second coil section.

9. The antenna module as claimed in claim 7, wherein a number of turns of the third coil section is larger than a number of turns of the first coil section.

10. An antenna module comprising:
    a substrate having first and second surfaces opposite to each other;
    a coil pattern formed on the first surface of the substrate; and
    a magnetic member covering the second surface of the substrate and having a through hole formed therein,
    wherein the coil pattern has a first extending section extending along a periphery of the substrate and a second extending section including one portion protruding from the first extending section toward the through hole in a plan view and wound in an opposite direction to a winding direction of the first extending section in a state overlapping the through hole,
    wherein the second extending section includes another portion that protrudes away from the through hole back toward the first extending section in plan view, and
    wherein there is no coil pattern on the second surface of the substrate.

* * * * *